(12) United States Patent
Lee et al.

(10) Patent No.: US 9,718,994 B2
(45) Date of Patent: Aug. 1, 2017

(54) CONDUCTIVE ADHESIVE TAPE AND MANUFACTURING METHOD THEREOF

(71) Applicant: AMOGREENTECH CO., LTD., Gimpo-si (KR)

(72) Inventors: Seung Hoon Lee, Goyang-si (KR); Yong Sik Jung, Namyangju-si (KR); Yun Mi So, Daejeon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 0 days.

(21) Appl. No.: 14/560,188

(22) Filed: Dec. 4, 2014

(65) Prior Publication Data
US 2015/0086743 A1    Mar. 26, 2015

Related U.S. Application Data

(62) Division of application No. PCT/KR2013/004614, filed on May 27, 2013.

(30) Foreign Application Priority Data

Jun. 4, 2012 (KR) .................. 10-2012-0059900

(51) Int. Cl.
*C09J 7/02* (2006.01)
*C09J 9/02* (2006.01)
(Continued)

(52) U.S. Cl.
CPC ............... *C09J 7/0289* (2013.01); *B32B 5/26* (2013.01); *B32B 7/12* (2013.01); *B32B 37/15* (2013.01);
(Continued)

(58) Field of Classification Search
CPC .. C09J 7/0289; C09J 7/02; H01B 1/00; B32B 37/15
See application file for complete search history.

(56) References Cited

U.S. PATENT DOCUMENTS 6,368,687 B1    4/2002 Joseph et al.
2010/0028656 A1*    2/2010 Kim .................. G02F 1/133305
428/323
(Continued)

FOREIGN PATENT DOCUMENTS

KR        200398477    10/2005
KR    1020080098841    11/2008
(Continued)

OTHER PUBLICATIONS

International Search Report—PCT/KR2013/004614 dated Aug. 9, 2013.

*Primary Examiner* — Victor Chang
(74) *Attorney, Agent, or Firm* — Cantor Colburn LLP (57) ABSTRACT

Provided is a conductive adhesive tape comprising: a substrate that is formed in a nano-web form having a number of pores by spinning a polymer material by a spinning method; and a conductive adhesive layer that is formed in a non-porous form by directly spinning a conductive adhesive material by a spinning method on one or both surfaces of the substrate, or that is laminated on one or both surfaces of the substrate. Accordingly, thickness of the adhesive tape can be made thin, adhesive strength of the adhesive tape can be enhanced, and the adhesive tape can be precisely attached on even a curved surface. Further, when removing the adhesive tape from components, the adhesive layer can be prevented from remaining on the surface of the components.

10 Claims, 5 Drawing Sheets

(51) Int. Cl.
   *C09J 7/04* (2006.01)
   *B32B 37/15* (2006.01)
   *H01B 1/00* (2006.01)
   *H01B 13/32* (2006.01)
   *B32B 5/26* (2006.01)
   *B32B 7/12* (2006.01)
   *C08K 3/04* (2006.01)

(52) U.S. Cl.
   CPC ............... *C09J 7/02* (2013.01); *C09J 7/0296* (2013.01); *C09J 7/041* (2013.01); *C09J 9/02* (2013.01); *H01B 1/00* (2013.01); *H01B 13/32* (2013.01); *B32B 2250/02* (2013.01); *B32B 2405/00* (2013.01); *C08K 3/04* (2013.01); *C08K 2201/001* (2013.01); *C09J 2201/134* (2013.01); *C09J 2201/602* (2013.01); *C09J 2205/102* (2013.01); *C09J 2400/163* (2013.01); *C09J 2400/263* (2013.01); *C09J 2467/006* (2013.01); *Y10T 428/1476* (2015.01); *Y10T 428/249983* (2015.04)

(56) References Cited

U.S. PATENT DOCUMENTS

| | | | |
|---|---|---|---|
| 2010/0035494 A1* | 2/2010 | Okada | C08J 7/047 442/136 |
| 2010/0233926 A1 | 9/2010 | Shin et al. | |

FOREIGN PATENT DOCUMENTS

| | | |
|---|---|---|
| KR | 1020110081484 | 7/2011 |
| KR | 1020110129109 | 12/2011 |

* cited by examiner

CONDUCTIVE ADHESIVE TAPE AND MANUFACTURING METHOD THEREOF

TECHNICAL FIELD

The present invention relates to an adhesive tape on both surfaces or one surface of which an adhesive layer is provided, and more particularly, to a conductive adhesive tape having electrical conductivity performance and an electromagnetic wave shielding function.

BACKGROUND ART

In general, conductive adhesive tapes are mainly used for the purpose of enabling two components to be electrically adhered to each other, and used in various forms.

One type of conventional conductive adhesive tapes is a conductive adhesive tape that is formed by coating an adhesive mixed with a conductive powder on an electrically conductive polyester fiber or nylon fiber on which Ni, Cu, Ag or the like with excellent electrical conductivity is electrolessly plated.

However, such a conductive tape is expensive because of using a conductive fiber, and burr can be caused from a cutting surface during cutting. The electrical conductivity and heat conductivity of the conductive adhesive tape is less than the adhesive tape with metal foils.

Another type of the conventional conductive adhesive tapes is an adhesive tape that is formed by laminating a metal foil such as aluminum on one surface of a polyester (PET) film, to increase the tear strength of the metal foil such as aluminum, and prevent wrinkling of the metal foil such as aluminum, and coating a conductive acrylic adhesive mixed with a conductive powder such as Ni on the other surface of the polyester (PET) film. However, such a conductive adhesive tape has a problem that electrical and thermal properties are deteriorated because of poor vertical electrical conductivity and thermal conductivity.

Further, another type of the conventional conductive adhesive tapes has problems that flexibility of the conductive adhesive tape is lowered by filling punched holes in a polymeric film layer with a conductive solution, and further a conductive material and a polymer film are separated or spaced from each other in the punched holes during flowing of the conductive solution.

As disclosed in Korean Utility Model Registration No. 20-0398477, a conventional conductive adhesive tape includes: a sheet layer that is a substrate; a first conductive metal paste coating layer that is coated on the upper side of the sheet; a second conductive metal paste coating layer that is coated on the lower side of the sheet; a first conductive adhesive layer laminated on the first conductive metal paste coating layer; a second conductive adhesive layer laminated on the second conductive metal paste coating layer; and a release paper layer that is laminated on the other surface of the second conductive adhesive layer laminated on the second conductive metal paste coating layer.

Here, the sheet that is a support material employs any one of a PET film, mesh fabric, nonwoven fabric, and rubber sheet. In the case of the PET film, a plurality of holes are formed and the plurality of holes are filled with a metal paste, to thus electrify the first conductive adhesive layer and the second conductive adhesive layer.

However, since the conventional conductive adhesive tape should employ a PET film, mesh fabric, nonwoven fabric, or rubber sheet as the sheet, and should form a plurality of holes for electrification, there are problems that the thickness of the conductive adhesive tape is thicker, the manufacturing process thereof is complicated, and the manufacturing cost thereof increases.

DISCLOSURE

Technical Problem

To solve the above problems or defects, it is an object of the present invention to provide a conductive adhesive tape and a method of manufacturing the same, in which a substrate is fabricated in a nano-web form made of a plurality of pores, by a spinning method, and an adhesive material is absorbed into the plurality of pores, to thereby allow the conductive adhesive tape to be made thin and to have an excellent conductivity.

It is another object of the present invention to provide a conductive adhesive tape and a method of manufacturing the same, in which a substrate is fabricated in a nano-web form made of a plurality of pores, by a spinning method, to thereby enhance a flexibility of the conductive adhesive tape so as to be precisely attached to even a curved surface.

It is another object of the present invention to provide a conductive adhesive tape and a method of manufacturing the same, in which an adhesive material is absorbed into a number of pores formed in a substrate, to thereby increase the amount of an adhesive and enhance an adhesive strength.

It is another object of the invention to provide a conductive adhesive tape and a method of manufacturing the same, in which a conductive metal is deposited on one surface of a substrate to thereby provide an electrical conductivity and perform an electromagnetic wave shielding function.

The technical problems to be solved in the present invention are not limited to the above-mentioned technical problems, and the other technical problems that are not mentioned in the present invention may be apparently understood by one of ordinary skill in the art to which the present invention belongs.

Technical Solution

To accomplish the above and other objects of the present invention, according to an aspect of the present invention, there is provided a conductive adhesive tape comprising: a substrate that is formed in a nano-web form having a number of pores by spinning a polymer material by a spinning method; and a conductive adhesive layer that is formed in a non-porous form by directly spinning a conductive adhesive material by a spinning method on one or both surfaces of the substrate, or that is laminated on one or both surfaces of the substrate.

According to another aspect of the present invention, there is provided a conductive adhesive tape comprising: a substrate that is formed in a nano-web form having a number of pores by spinning a polymer material by a spinning method; a non-porous film layer that is formed on one surface of the substrate and that has an electrical conductivity; a first conductive adhesive layer that is formed in a non-porous form by spinning a conductive adhesive material by the spinning method on the non-porous film layer; and a second conductive adhesive layer that is laminated on the other surface of the substrate.

According to another aspect of the present invention, there is provided a conductive adhesive tape comprising: a first substrate that is formed in a nano-web form having a number of pores by spinning a polymer material by a spinning method; a non-porous film layer that is formed on one surface of the first substrate, and has an electrical conductivity; a first conductive adhesive layer that is laminated on the other surface of the substrate in a non-porous form by spinning a conductive adhesive material by the spinning method; and a conductive double-side tape that is laminated on the non-porous film layer, wherein the conductive double-side tape comprises: a second substrate that is formed in a nano-web form having a number of pores by spinning the polymer material by the spinning method; a second conductive adhesive layer that is formed on one surface of the second substrate; and a third conductive adhesive layer that is formed on the other surface of the second substrate.

According to another aspect of the present invention, there is provided a conductive adhesive tape comprising: a substrate that is formed in a nano-web form having a number of pores by spinning a polymer material by a spinning method; a first conductive adhesive layer that is stacked on one surface of the substrate; and an electromagnetic wave shielding layer that is stacked on the other surface of the substrate; and a second conductive adhesive layer that is stacked on the surface of the electromagnetic wave shielding layer, wherein the first conductive adhesive layer and the second conductive adhesive layer are formed by using any one of a casting method, a coating method, and a gravure coating method.

According to another aspect of the present invention, there is provided a method of manufacturing a conductive adhesive tape comprising the steps of: forming a first conductive adhesive layer by spinning a conductive adhesive material; forming a substrate in a nano-web form by spinning a polymer material on the first conductive adhesive layer; and forming a second conductive adhesive layer by spinning the conductive adhesive material on the surface of the substrate.

According to another aspect of the present invention, there is provided a method of manufacturing a conductive adhesive tape comprising the steps of: forming a substrate in a nano-web form by spinning a polymer material; forming an electromagnetic wave shielding layer to shield electromagnetic waves by depositing an electrically conductive metallic material on one surface of the substrate; forming a first conductive adhesive layer by spinning a conductive adhesive material on the electromagnetic wave shielding layer; and laminating a second conductive adhesive layer that is formed by spinning a conductive adhesive material on the other surface of the substrate.

According to another aspect of the present invention, there is provided a method of manufacturing a conductive adhesive tape comprising the steps of: forming a substrate in a nano-web form by spinning a polymer material; forming a non-porous film layer by spinning a polymeric material containing PU or TPU and an electrically conductive material on one surface of the substrate; forming a first conductive adhesive layer by spinning a conductive adhesive material on the non-porous film layer; and laminating a second conductive adhesive layer that is formed by spinning a conductive adhesive material on the other surface of the substrate.

According to another aspect of the present invention, there is provided a method of manufacturing a conductive adhesive tape comprising the steps of: forming a first substrate in a nano-web form by spinning a polymer material; forming a non-porous film layer by spinning a polymeric material containing PU or TPU and an electrically conductive material on one surface of the first substrate; forming a first conductive adhesive layer by spinning a conductive adhesive material; laminating the first conductive adhesive layer on one surface of the first substrate; and laminating a conductive double-side tape on the non-porous film layer.

Advantageous Effects

As described above, a conductive adhesive tape and a method of manufacturing the same, according to the present invention, is configured by forming a substrate in a nano-web form made of a plurality of pores, by a spinning method, and stacking an adhesive material on one or both surfaces of the substrate by the spinning method, so that the adhesive material is absorbed into the plurality of pores, to thereby allow the conductive adhesive tape to be made thin and to have an excellent conductivity.

In addition, a conductive adhesive tape and a method of manufacturing the same, according to the present invention, is configured by forming a substrate in a nano-web form made of a plurality of pores, by a spinning method, to thereby enhance a flexibility of the conductive adhesive tape so as to be precisely attached to even a curved surface.

In addition, a conductive adhesive tape and a method of manufacturing the same, according to the present invention, is configured so that an adhesive material is absorbed into a number of pores formed in a substrate, to thereby increase the amount of an adhesive and enhance an adhesive strength.

In addition, a conductive adhesive tape and a method of manufacturing the same, according to the present invention, is configured by depositing a conductive metal on one surface of a substrate to thereby provide an electrical conductivity and perform an electromagnetic wave shielding function.

BEST MODE

Embodiments of the present invention will be described below in detail with reference to the accompanying drawings. Here, the size or shape of the components illustrated in the drawings may be shown to be exaggerated for convenience and clarity of illustration. In addition, specifically defined terms may be changed according to the intention or practices of users or operators in consideration of the construction and operation of the present invention. The definition of the terms should be made based on contents throughout the present specification.

Figure 1:
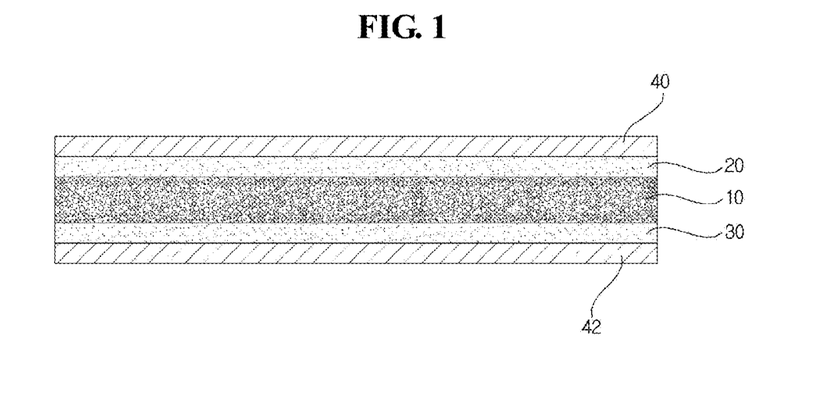
FIG. 1 is a cross-sectional view of a conductive adhesive tape according to a first embodiment of the present invention.
Figure 2:
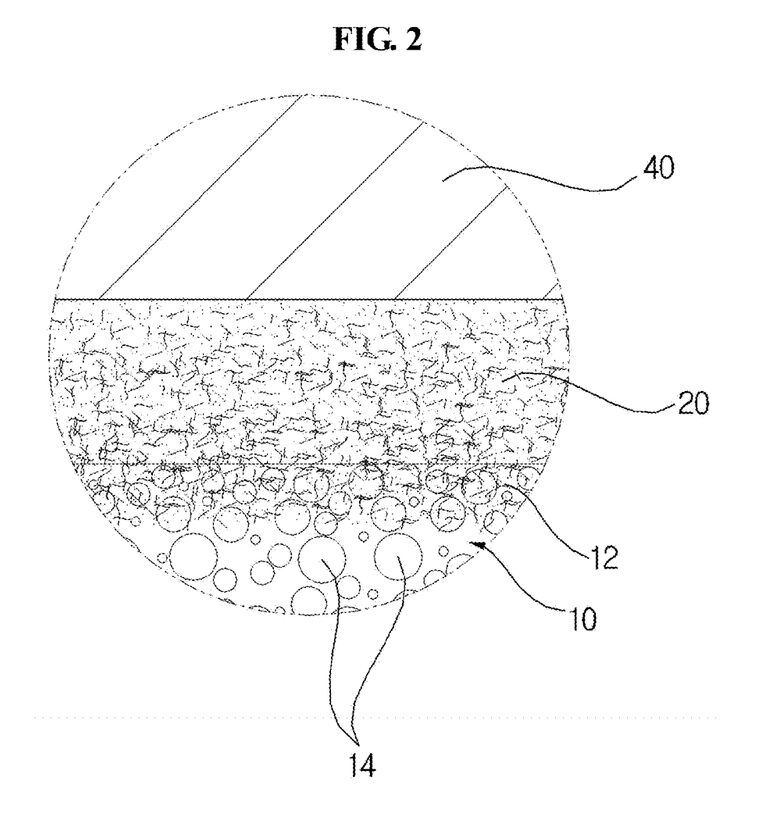
FIG. 2 is a partial enlarged view of the conductive adhesive tape according to the first embodiment of the present invention.
Figure 3:
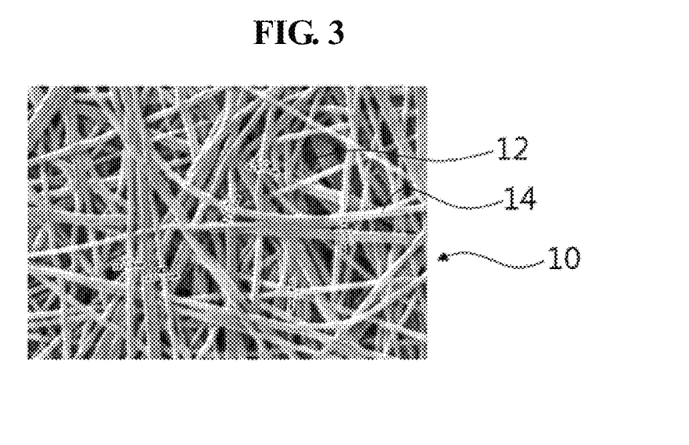
FIG. 3 is an enlarged view of a substrate according to the first embodiment of the present invention.

FIG. 1 is a cross-sectional view of a conductive adhesive tape according to a first embodiment of the present invention. FIG. 2 is a partial enlarged view of the conductive adhesive tape according to the first embodiment of the present invention. FIG. 3 is an enlarged view of a substrate according to the first embodiment of the present invention.

The conductive adhesive tape according to the first embodiment includes: a substrate 10 that is formed in a nano-web form of a certain thickness by accumulating ultra-fine fiber strands by a spinning method; and adhesive layers 20 and/or 30 that are formed on both and/or one surface of the substrate 10.

The substrate 10 is manufactured in a nano-web form having a plurality of pores 12 by spinning the polymer material into ultra-fine fiber strands 14 by a spinning method, and accumulating the ultrafine fiber strands 14.

Here, the spinning method that is applied for the present invention may employ any one of electrospinning, air-electrospinning (AES), electrospray, electrobrown spinning, centrifugal electrospinning, and flash-electrospinning.

That is, any of spinning methods of making ultrafine fiber strands in an accumulated form can be also applied to the substrate 10 and the adhesive layers 20 and 30 according to the present invention.

For example, the polymer materials used to make the substrate 10 in the present invention may be: polyvinylidene fluoride (PVdF), poly(vinylidene fluoride-co-hexafluoropropylene), a perfluoropolymer, polyvinyl chloride, polyvinylidene chloride, or a copolymer thereof; a polyethylene glycol derivative containing polyethylene glycol dialkylether and polyethylene glycol dialkylester; poly(oxymethylene-oligo-oxyethylene); polyoxide containing polyethylene oxide and polypropylene oxide; polyvinyl acetate, poly(vinyl pyrrolidone-vinyl acetate), polystyrene, and a polystyrene acrylonitrile copolymer; a polyacrylonitrile copolymer containing polyacrylonitrile (PAN) and a polyacrylonitrile methyl methacrylate copolymer; or polymethyl methacrylate, a poly methyl methacrylate copolymer, or a mixture thereof.

Since the substrate 10 is produced by an electrospinning method, the thickness of the substrate 10 is determined according to the dose of the electrospun polymer material. Thus, it is advantageously easy to make the thickness of the substrate 10 into a desired thickness. That is, if the dose of the electrospun polymer material is made less, the thickness of the substrate 10 may be made thin, but if the dose of the electrospun polymer material is increased, the thickness of the substrate 10 may be made thick, to thus increase strength of the substrate.

In this way, the substrate 10 is formed in a nano-web form where fiber strands are accumulated by a spinning method, to thus be made into a shape of having a large number of pores without a separate process, and to thus be possible to adjust size of each of the pores according to the dose of the spun polymer material.

In some embodiments, since the substrate 10 may be fabricated in a nano-web shape having a large number of pores 12 by electrospinning a polymer material to thereby make ultra-fine fiber strands 14 and accumulating the ultra-fine fiber strands 14 in a predetermined thickness, the substrate 10 can be made thin and further can be made to have a variety of thicknesses. Accordingly, the conductive adhesive tape can be made to have a desired thickness.

In addition, since the substrate 10 is fabricated in a nano-web shape in which ultra-fine fiber strands 14 are accumulated, the substrate 10 has flexibility. Thus, the conductive adhesive tape can be precisely attached to even a portion where a surface to which the conductive adhesive tape is attached is formed in a staircase or corrugated shape.

That is, in the case of the substrate used in the conventional conductive adhesive tape, the substrate 10 may have poor flexibility. Thus, when the conductive adhesive tape is attached on the surface of the staircase shape or the corrugated portion, the adhesive tape is detached from the surface of the staircase shape or the corrugated portion by rigidity of the substrate. Accordingly, an air layer is formed at a portion where the adhesive tape is detached, thus lowering the adhesive strength of the adhesive tape. However, the substrate 10 according to the present embodiment has excellent flexibility because of a nano-web form to thus solve the problems of the conventional adhesive tape.

Further, since the substrate 10 is fabricated in a nano-web shape in which the ultra-fine fiber strands 14 are accumulated, the tensile strength of the substrate 10 is strong to thereby prevent the substrate 10 from being torn by force exerted from the outside and although the substrate 10 is made thin, the substrate 10 has a sufficient rigidity.

The conductive adhesive layers 20 and 30 may include a first conductive adhesive layer 20 that is stacked on one surface of the substrate 10, and a second conductive adhesive layer 30 that is stacked on the other surface of the substrate 10. Otherwise, a conductive adhesive layer may be stacked on only one surface of the substrate 10.

The conductive adhesive layers 20 and 30 are prepared in the same way as an electrospinning method that is used for making the substrate 10. In other words, a conductive adhesive material having a viscosity suitable for electrospinning is prepared by mixing any one of an electrically conductive metal such as Ni, Cu, and Ag having an excellent electrical conductivity, carbon black, carbon nanotube, graphene, and conductive polymer (PDOT), and a conductive adhesive material with a mixture of an adhesive and a solvent, and the adhesive material is stacked in a predetermined thickness on the surface of the substrate 10 by using the electrospinning method.

When spinning the conductive adhesive material on the substrate 10, the conductive adhesive material is absorbed into the pores formed in the substrate 10, thereby making the first conductive adhesive layer 20 and the second conductive adhesive layer 30 conduct electricity.

Here, it is desirable that the pores 12 formed on the substrate 10 should have diameters in size through which the conductive adhesive material can be absorbed and the viscosity of the conductive adhesive material should have a viscosity that can also be absorbed into the pores 12.

Here, in addition to a method of directly spinning a conductive adhesive material on the substrate 10, it is also possible to use a method of separately preparing the substrate 10, the first conductive adhesive layer 20, and the second conductive adhesive layer 30, by using an electrospinning method, laminating the first conductive adhesive layer 20 on one surface of the substrate 10 in a lamination process, and laminating the second conductive adhesive layer 30 on the other surface of the substrate 10.

The thickness of each of the conductive adhesive layers 20 and 30 is determined in accordance with a dose of the spun adhesive material. Therefore, it is possible to make each of the conductive adhesive layers 20 and 30 in a desired thickness.

In addition, the conductive adhesive layers 20 and 30 are spun in the form of ultra-fine fiber strands, and respectively adhered on both the surfaces of the substrate 10. Here, the conductive adhesive material is introduced into the pores 12 of the substrate 10, and thus increases an adhesive strength between each of the adhesive layers 20 and 30 and the substrate 10. As well, the conductive adhesive layers 20 and 30 are introduced into the pores 12 of the substrate 10, and thus increases the amount of the conductive adhesive. Accordingly, in the case that the conductive adhesive tape according to the present embodiment has the same thickness as the conventional conductive adhesive tape, the former has the more amount of the adhesive than the latter, to thereby increase the adhesive strength as much as the amount of the adhesive, and improve the electrical conductivity.

The first adhesive layer 20 and the second adhesive layer 30 may be formed into the adhesive layers having an identical adhesive strength. In other words, when the two adhesive layers have an identical adhesive strength, it is preferable to use the two adhesive layers at regions from which they do not need to detach once they are attached thereon.

Also, the conductive adhesive layers 20 and 30 can be formed so that one has a slightly poorer adhesive strength than the other. That is, in one embodiment, the adhesive strength of the first adhesive layer 20 is formed higher than that of the second adhesive layer 30, and thus after the conductive adhesive layers 20 and 30 are attached on both the surfaces of the substrate 10, it is preferable to use the second adhesive layer 30 at a region from which it is easily detached and to which it is attached again.

A first release film 40 for protecting the first adhesive layer 20 is attached on the surface of the first adhesive layer 20, and a second release film 42 for protecting the second adhesive layer 30 is attached on the surface of the second adhesive layer 30.

The first release film 40 and the second release film 42 are formed of a different material to each other. In one embodiment, the first release film 40 is formed of a paper material and the second release film 42 is formed of a synthetic resin material.

Here, the reason why the first release film 40 and the second release film 42 are formed of a different material to each other is to make an attachment force between the first release film 40 and the first adhesive layer 20, and an attachment force between the second release film 42 and the second adhesive layer 30 differ from each other.

The reason for this is to prevent the second release film 42 from being peeled away from the second conductive adhesive layer 30 when the first release film 40 is peeled away from the first conductive adhesive layer 20 in order to make the first conductive adhesive layer 20 attached on a component.

In other words, if the second release film 42 is peeled away from the second conductive adhesive layer 30 when the first release film 40 is peeled away from the first conductive adhesive layer 20, the second adhesive layer 30 may damage. In order to prevent damage to the conductive adhesive layer, the attachment force between the first release film 40 and the first conductive adhesive layer 20, and the attachment force between the second release film 42 and the second conductive adhesive layer 30 can be formed differently to each other.

Figure 4:
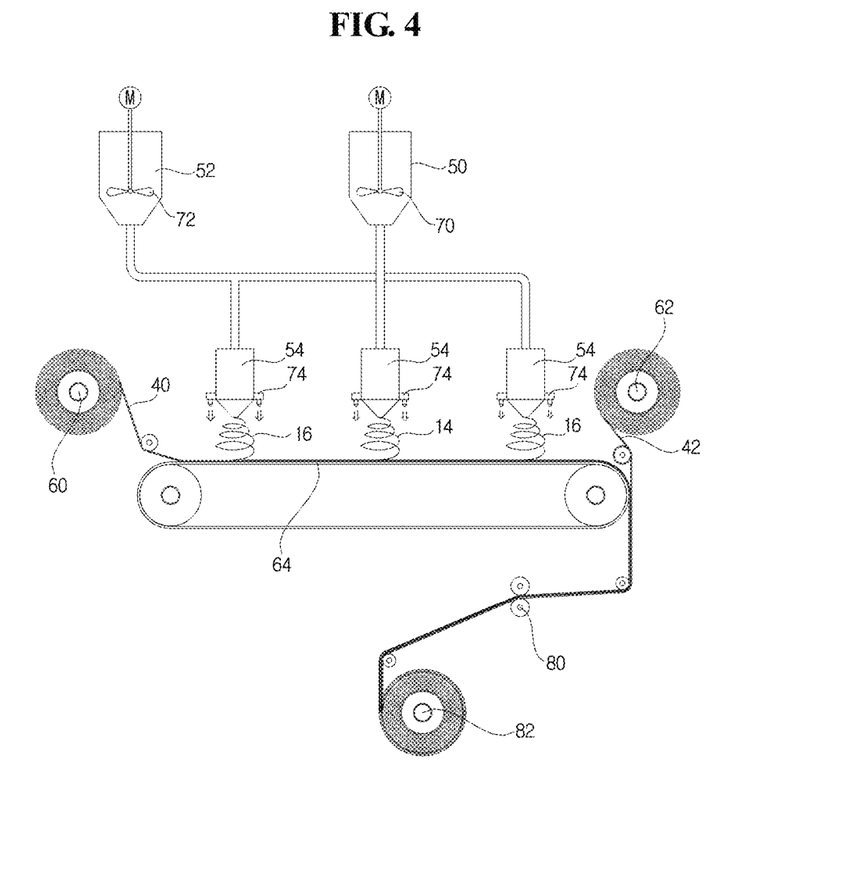
FIG. 4 is a schematic diagram of an electrospinning apparatus for manufacturing the conductive adhesive tape according to the first embodiment of the present invention.

FIG. 4 is a block diagram of a configuration of an electrospinning apparatus for manufacturing a conductive adhesive tape according to a first embodiment of the present invention.

Referring to FIG. 4, the electrospinning apparatus according to the present invention includes: a first mixing tank 50 in which a polymer material and a solvent are mixed and stored; a second mixing tank 52 in which a conductive adhesive and a solvent are mixed and stored; a first spinning nozzle 54 that is connected to a high voltage generator and the second mixing tank 52, and forms a first conductive adhesive layer 20; a second spinning nozzle 56 that is connected to a high voltage generator and the first mixing tank 50, and forms a substrate 10; and a third spinning nozzle 58 that is connected to a high voltage generator and the second mixing tank 52, and forms a second conductive adhesive layer 30.

The first mixing tank 50 is provided with a first agitator 70 that evenly mixes the polymer material and the solvent and maintains a constant viscosity of the polymer material, and the second mixing tank 52 is provided with a second agitator 72 that evenly mixes the conductive adhesive and the solvent and maintains a constant viscosity of the adhesive material.

A collector 64 is provided below the first through third spinning nozzles 54, 56, and 58, in which the collector 64 enables the first conductive adhesive layer 20, the substrate 10, and the second conductive adhesive layer 30 to be sequentially laminated on one another. In addition, a high voltage electrostatic force of 90 to 120 Kv is applied between the collector 64 and each of the spinning nozzles 54, 56, and 58, to thereby spin ultra-fine fiber strands 14 and 16, and to thus form an ultra-fine nano-web.

Here, the first spinning nozzle 54, the second spinning nozzle 56, and the third spinning nozzle 58 are arranged in the form of a plurality of spinning nozzles, respectively, in which the plurality of spinning nozzles may be arranged in sequence in a chamber or may be arranged in different chambers, respectively.

The first spinning nozzle 54, the second spinning nozzle 56, and the third spinning nozzle 58 are provided with an air spray apparatus 74, respectively, to thereby prevent the fiber strands 14 and 16 spun from the first spinning nozzle unit 54, the second spinning nozzle 56, and the third spinning nozzle 58 from fluttering without being smoothly collected to the collector 64.

The multi-hole spin pack nozzles used in the present invention are made to set air pressure of air spraying to be in the range of about 0.1 to about 0.6 MPa. In this case, air pressure that is less then about 0.1 MPa, does not contribute to capture and integrate the fiber strands. In the case that air pressure exceeds about 0.6 MPa, the cone of each spinning nozzle is hardened to thus cause a clogging phenomenon of the needle to occur and to thereby cause a spinning trouble to occur.

A conveyor that automatically transfers a first release film 40 may be used as the collector 64, in order to make the first conductive adhesive layer 20, the substrate 10, and the second conductive adhesive layer 30 sequentially stacked on the first release film 40. Otherwise, a table may be used as collector 64, in order to make the first conductive adhesive layer 20, the substrate 10, and the second conductive adhesive layer 30 formed in respectively different chambers.

A first release film roll 60 around which the first release film 40 is wound is disposed in the front side of the collector 64, to thus feed the first release film 40 onto the top surface of the collector 64. In addition, a second release film roll 62 around which a second release film 42 is wound is disposed in the rear side of the collector 64, to thus feed the second release film 42 attached on a surface of the second conductive adhesive layer 30.

A pressure roller 80 that pressurizes (or calenders) the first conductive adhesive layer 20, the substrate 10, and the second conductive adhesive layer 30 to have a constant thickness is provided at one side of the collector 64. A tape roll 82 is provided, around which the adhesive tapes pressurized via the pressure roller 80 are wound.

A process for producing an adhesive tape by using an electrospinning apparatus as described above will be described as follows.

First, when the collector 64 is driven, the first release film 40 wound on the first release film roll 60 is released and moved along the top surface of the collector 64.

Then, a high voltage electrostatic force is applied between the collector 64 and the first spinning nozzle 54, and thus the conductive adhesive material is made into ultra-fine fiber strands 16 by the first spinning nozzle 54 to then be spun to the top surface of the first release film 40. As a result, the ultra-fine fiber strands 16 are accumulated onto the surface of the first release film 40 to thus form the first conductive adhesive layer 20 in a non-porous film shape.

When the ultra-fine fiber strands are accumulated, the viscosity of the ultra-fine fiber strands is considerably low, and thus the first conductive adhesive layer 20 is manufactured in a non-porous film shape.

Here, when the first spinning nozzle 54 spins the fiber strands 16, the air spray apparatus 74 mounted in the first spinning nozzle 54 sprays air to the fiber strands 16, so that the fiber strands 16 can be collected and captured on the surface of the first release film 40 without fluttering.

Then, the first conductive adhesive layer 20 is completely manufactured, the first conductive adhesive layer 20 is moved to the bottom of the second spinning nozzle 56, and when a high voltage electrostatic force is applied between the collector 64 and the second spinning nozzle 56, the polymer material is made into ultra-fine fiber strands 14 by the second spinning nozzle 56 to then be spun on the first conductive adhesive layer 20. As a result, the substrate 10 is formed onto the surface of the first conductive adhesive layer 20 in an ultra-fine nano-web shape having a large number of pores 12.

Here, the conductive adhesive material of the first conductive adhesive layer 20 is absorbed into the pores 12 formed on the substrate 10.

In addition, when the substrate 10 is completely manufactured, the substrate 10 is moved to the bottom of the third spinning nozzle 58, and when a high voltage electrostatic force is applied between the collector 64 and the third spinning nozzle 58, the conductive adhesive material is made into ultra-fine fiber strands 16 by the third spinning nozzle 58 to then be spun on the surface of the substrate 10. As a result, the second a conductive adhesive layer 30 is formed onto the surface of the substrate 10 in a non-porous film shape.

In this case, the conductive adhesive material is absorbed into the pores 12 formed on the substrate 10, to thus make the first conductive adhesive layer 20 and the second conductive adhesive layer 30 conduct electricity, and to thereby manufacture the conductive adhesive tape.

In addition, the second release film 42 wound on the second release film roll 62 is covered on the surface of the second conductive adhesive layer 30. In this way, the completed adhesive tape is pressurized in a predetermined thickness as it passes through the pressure roller 80. When the pressure roller 80 presses the first conductive adhesive layer 20 and the second conductive adhesive layer 30, the adhesive material is absorbed into the pores 12 formed on the substrate 10 more effectively, and thus the first conductive adhesive layer 20 and the second conductive adhesive layer 30 conduct electricity more reliably.

Here, in the case that only one adhesive layer is provided in the substrate 10, a process of forming the second conductive adhesive layer is omitted.

The first conductive adhesive layer 20 and the second conductive adhesive layer 30 may be formed to have an identical adhesive strength, or any one of the two conductive adhesive layers 20 and 30 may be formed to have a weaker adhesive strength than the other of the two conductive adhesive layers 20 and 30.

Further, in addition to the above-described method, the following method may be applicable in which the substrate 10 and the conductive adhesive layers 20 and 30 are each separately produced, and then the first conductive adhesive layer 20 is disposed on one surface of the substrate 10 while the second conductive adhesive layer 30 is disposed on the other surface of the substrate 10, to then mutually laminate the substrate 10 and each of the first and second conductive adhesive layers 20 and 30 and to thus produce the conductive adhesive tape.

Figure 5:
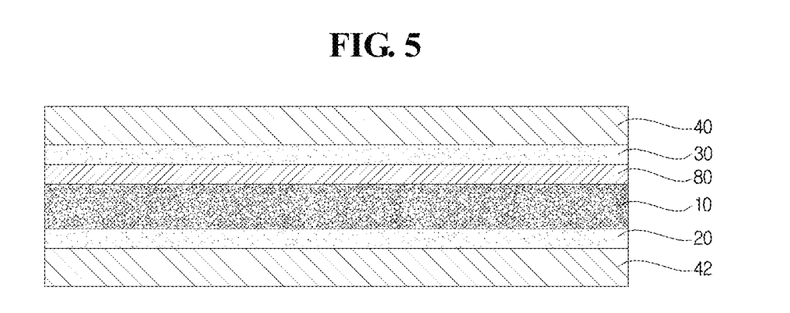
FIG. 5 is a cross-sectional view of a conductive adhesive tape according to a second embodiment of the present invention.

FIG. 5 is a cross-sectional view of a conductive adhesive tape according to a second embodiment of the present invention.

The conductive adhesive tape according to the second embodiment includes: a substrate 10 that is formed in a nano-web form of a certain thickness by accumulating ultra-fine fiber strands by a spinning method; a first conductive adhesive layer 20 that is formed on one surface of the substrate 10; an electromagnetic wave shielding layer 80 that is stacked on the other surface of the substrate, for shielding electromagnetic waves; and a second conductive adhesive layer 30 that is stacked on the surface of the electromagnetic wave shielding layer 80.

Since the substrate 10, the first conductive adhesive layer 20, and the second conductive adhesive layer 30 according to the second embodiment are of the same structures as those described in the first embodiment, the description thereof will be omitted.

The electromagnetic wave shielding layer 80 is formed by performing deposition (sputtering) of a metal having an electrical conductivity such as copper (Cu) or aluminum (Al) on the substrate 10.

The electromagnetic wave shielding layer 80 is deposited on the surface of the substrate 10 that is formed in a nano-web form having a plurality of pores 12, to thus prevent peeling off of the electromagnetic wave shielding layer 80 and improve the electromagnetic wave shielding performance.

Thus, the conductive adhesive tape according to the second embodiment includes the first conductive adhesive tape 20 and the second conductive adhesive tape 30 both having the electrically conductive material, to thus provide electrically conductive performance, and also includes the electromagnetic wave shielding layer 80 formed of an electrically conductive metal, to thus further enhance electrically conductive performance as well as shield electromagnetic waves.

A method of manufacturing a conductive adhesive tape according to the second embodiment as described above will follow. A high viscosity of the first conductive adhesive layer 20 is formed on one surface of the substrate 10 by using the electrospinning device as described above, the electromagnetic wave shielding layer 80 is formed on the other surface of the substrate 10 by depositing an electrically conductive metal on the other surface of the substrate 10, and the second conductive adhesive layer 30 is stacked on the surface of the electromagnetic wave shielding layer 80, by spinning a conductive adhesive material on the surface of the electromagnetic wave shielding layer 80 by using an electrospinning device, or by the other method other than such a spinning method, to thereby manufacture the conductive adhesive tape.

The first conductive adhesive layer 20 is formed by spinning a conductive adhesive material having the high viscosity performance on the substrate 10. Accordingly, when the conductive adhesive material is spun on one surface of the substrate 10, the conductive adhesive material is introduced into the pores 12 formed on the substrate 10 and then prevented from leaking from the other surface of the substrate 10. As a result, a problem that occurs due to the adhesive material when depositing the electromagnetic wave shielding layer 80 on the other surface of the substrate 10 can be solved.

In addition to the above-described manufacturing method, a method of separately preparing the first conductive adhesive layer 20 by using the electrospinning apparatus and then laminating the first conductive adhesive layer 20 on one surface of the substrate 10 is also applicable for the present invention. That is, the substrate 10 is formed by using one electrospinning apparatus, the electromagnetic wave shielding layer 80 is formed on one surface of the substrate 10 by depositing the electrically conductive metal on one surface of the substrate 10, and the second conductive adhesive layer 30 is stacked on the surface of the electromagnetic wave shielding layer 80 by spinning the conductive adhesive material on the surface of the electromagnetic wave shielding layer 80. Then, the first conductive adhesive layer 20 is prepared by using another electrospinning apparatus, and then is laminated on the substrate 10 by using a thermal compression bonding method.

Here, since the first conductive adhesive layer is laminated on one surface of the substrate 10, it is possible to prevent the adhesive material from leaking from the other surface of the substrate 10 through the pores 12 of the substrate 10.

Figure 6:
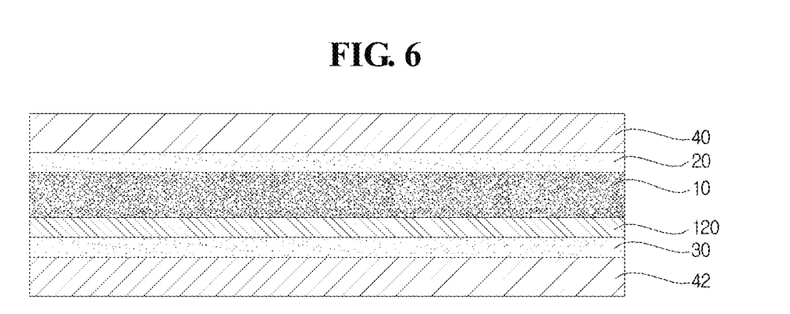
FIG. 6 is a cross-sectional view of a conductive adhesive tape according to a third embodiment of the present invention.

FIG. 6 is a cross-sectional view of a conductive adhesive tape according to a third embodiment of the present invention.

The conductive adhesive tape according to the third embodiment includes: a substrate 10 that is formed in a nano-web form of a certain thickness by accumulating ultra-fine fiber strands by a spinning method; a non-porous film layer 120 formed on one surface of the substrate 10; a second conductive adhesive layer 30 that is stacked on the non-porous film layer 120; and a first conductive adhesive layer 20 that is laminated on the other surface of the substrate 10.

The conductive adhesive tape according to the third embodiment may be manufactured by separately preparing the substrate 10 and the first conductive adhesive layer 20; and cross-laminating the substrate 10 and the first conductive adhesive layer 20 in a lamination process. Then, the conductive adhesive tape according to the third embodiment may be formed by depositing the electromagnetic wave shielding layer on one surface of the substrate.

Since the substrate 10, the first conductive adhesive layer 20, and the second conductive adhesive layer 30 according to the third embodiment are of the same structures as those described in the first embodiment, the description thereof will be omitted.

The non-porous film layer 120 is formed by electrospinning a polymer material containing PU (polyurethane) or TPU (thermoplastic polyurethane) into ultra-fine fiber strands and accumulating the ultrafine fiber strands, in which the PU or TPU is dissolved in a solvent, and is formed in a non-porous shape having no pores without any heat treatment.

Then, the non-porous film layer 120 includes an electrically conductive metal such as Ni, Cu, and Ag having an excellent electrical conductivity, and a conductive material such as carbon blocks, carbon nanotubes, graphene, conductive polymers (PDOT), thus having an electrical conductivity.

Here, the non-porous film layer 120 is stacked on the substrate 10 to thus play a role of blocking the surface of the substrate 10 and preventing the conductive adhesive material from being introduced into the pores 12 of the substrate 10 when forming the second conductive adhesive layer 30.

When spinning the conductive adhesive layer on the substrate 10 by using the electrospinning apparatus, the conductive adhesive material is absorbed into the pores 12 of the substrate 10. In this case, in the case that the conductive adhesive material is excessively absorbed into the pores 12 of the substrate 10, the conductive adhesive material is leaked from the other side of the substrate 10. In this case, when depositing the electromagnetic wave shielding layer on the surface of the substrate 10 for providing the electrical conductive performance and electromagnetic wave shielding performance, the adhesive material is present on the surface of the substrate 10 and thus there is a problem during the deposition operation.

In this way, when a step of depositing an electromagnetic wave shielding layer on the substrate is added, a method of separately preparing the substrate and the conductive adhesive layer and then laminating the substrate and the conductive adhesive layer is more desirable than a method of directly spinning the conductive adhesive layer on the substrate.

Figure 7:
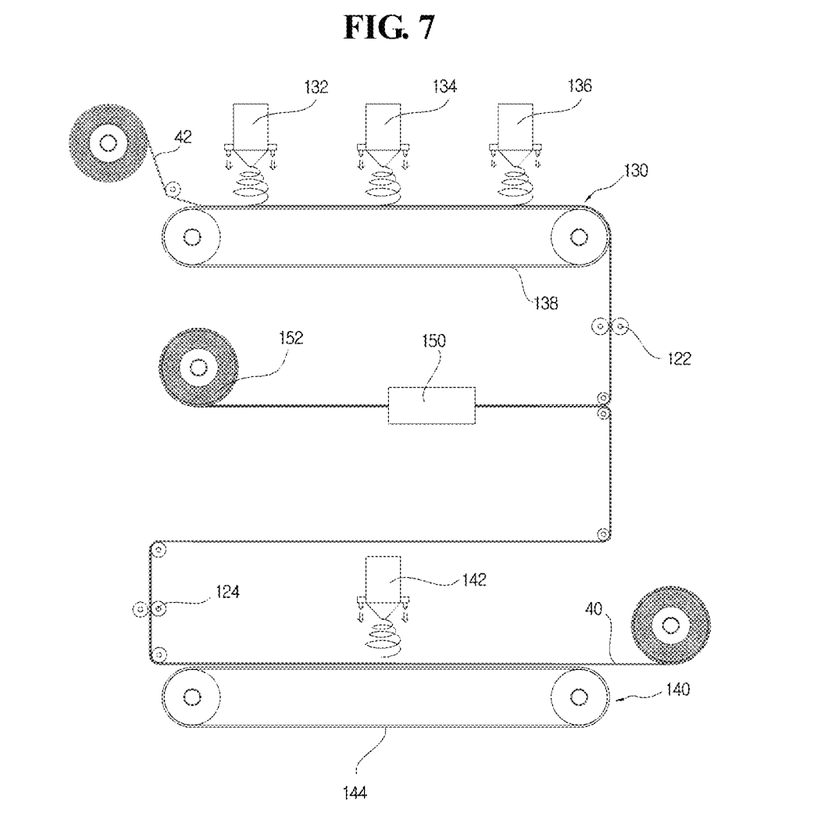
FIG. 7 is a schematic diagram of an electrospinning apparatus for manufacturing the conductive adhesive tape according to the third embodiment of the present invention.

FIG. 7 is a block diagram of an electrospinning apparatus for producing the conductive adhesive tape according to the third embodiment of the present invention.

The electrospinning apparatus according to the third embodiment includes: a first electrospinning device 130 that manufactures a substrate 10, a non-porous film layer 120 formed on one surface of the substrate 10, and a second conductive adhesive layer 30 that is stacked on the non-porous film layer 120; a second electrospinning device 140 for producing a first conductive adhesive layer 20; and a lamination device 150 for laminating the substrate 10 and the first conductive adhesive layer 20.

The first electrospinning device 120 includes: a collector 138 on which a second release film 42 is moved; a first spinning nozzle 132 that is disposed on the upper side of the collector 138, and that spins a conductive adhesive material on the second release film 42 to thus form a second conductive adhesive layer 30; a second spinning nozzle 134 that spins a polymer material containing PU or TPU to thus form the non-porous film layer 120; and a third spinning nozzle 136 that spins a polymer material on the non-porous film layer 120 to thus form the substrate 10.

In addition, the second electrospinning device 140 includes: a collector 144 on which a first release film 40 is moved; and a spinning nozzle 142 that is disposed on the upper side of the collector 144, and that spins a conductive adhesive material on the first release film 40 to thus form a first conductive adhesive layer 20.

A first pressing roller 122 that makes the substrate 10, the non-porous film layer 120, and the second conductive adhesive layer 30 have a constant thickness, respectively, is disposed at one side of the first electrospinning device 130, and a second pressing roller 124 that makes the first conductive adhesive layer 20 have a constant thickness is disposed at one side of the second electrospinning device 140.

The collector and the spinning nozzles according to the third embodiment are of the same construction and operation as those described in the first embodiment, and thus the detailed description thereof will be omitted.

A process for producing the conductive adhesive tape by using the electrospinning apparatus according to the third embodiment of the present invention as described above will be described as follows. First, when the collector 138 is driven, the second release film 42 is moved along the top surface of the collector 138.

Then, a high voltage electrostatic force is applied between the collector 138 and the first spinning nozzle 132, and thus the conductive adhesive material is made into ultra-fine fiber strands by the first spinning nozzle 132 to then be spun to the top surface of the second release film 42. As a result, the ultra-fine fiber strands are accumulated onto the surface of the second release film 42 to thus form the second conductive adhesive layer 30 in a non-porous film shape.

Then, the second conductive adhesive layer 30 is moved into the lower portion of the second spinning nozzle 134. Then, a high voltage electrostatic force is applied between the collector 138 and the second spinning nozzle 134, and thus a polymer material containing PU or TPU and a conductive material is spun on the second conductive adhesive layer 30 by the second spinning nozzle 134, to thus form the non-porous film layer 120.

Then, the non-porous film layer 120 is moved into the lower portion of the third spinning nozzle 136. Then, a high voltage electrostatic force is applied between the collector 138 and the third spinning nozzle 136, and thus a polymer material is made into ultra-fine fiber strands by the third spinning nozzle 136 to then be spun to the non-porous film layer 120. As a result, the substrate 10 of the ultra-fine nano-web form having a plurality of pores 12 is formed on the non-porous film layer 120.

Then, when the collector 144 of the second electrospinning device is driven, the first release film 40 is moved along the upper surface of the collector 144. Then, a high voltage electrostatic force is applied between the collector 144 and the spinning nozzle 142, and thus the conductive adhesive material is made into ultra-fine fiber strands by the spinning nozzle 142 to then be spun to the top surface of the first release film 40. As a result, the ultra-fine fiber strands are accumulated onto the surface of the first release film 40 to thus form the first conductive adhesive layer 20 in a non-porous film shape.

Thus, when the substrate 10 and the first conductive adhesive layer 20 are completely manufactured, the substrate 10 and the first conductive adhesive layer 20 are supplied to the laminating device 150, and the laminating device 150 laminates the substrate 10 and the first conductive adhesive layer 20, to thereafter form the conductive adhesive tape and wind the conductive adhesive tape on an adhesive tape roll 152.

Figure 8:
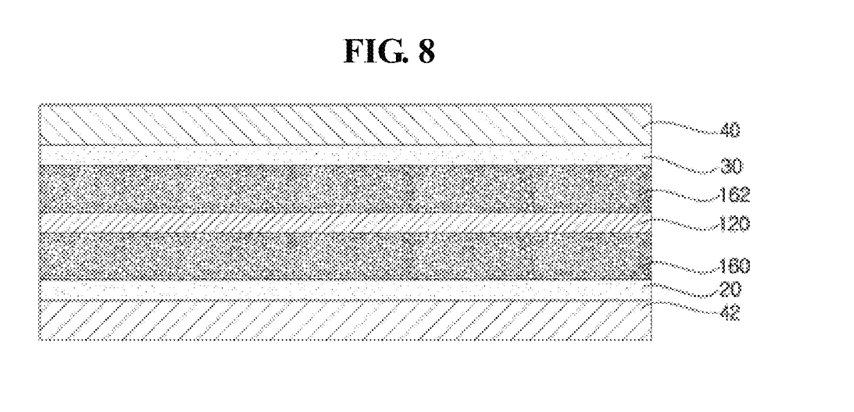
FIG. 8 is a cross-sectional view of a conductive adhesive tape according to a fourth embodiment of the present invention.

FIG. 8 is a cross-sectional view of a conductive adhesive tape according to a fourth embodiment of the present invention.

The conductive adhesive tape according to the fourth embodiment includes: a first substrate 160 that is formed in a nano-web form of a certain thickness by accumulating ultra-fine fiber strands by a spinning method; a non-porous film layer 120 formed on one surface of the first substrate 160; a second substrate 162 that is stacked on the non-porous film layer 120; a second conductive adhesive layer 30 that is formed on the second substrate 162; and a first conductive adhesive layer 20 that is laminated on the other surface of the first substrate 160.

The conductive adhesive tape according to the fourth embodiment as described above is of the same structure and manufacturing process as those of the conductive adhesive tape according to the third embodiment above. However, the substrate is configured to include the first and second substrates, and the second conductive adhesive layer 30 is spun on the second substrate 162 having a plurality of pores, to thus enhance the adhesive strength of the conductive adhesive tape.

Figure 9:
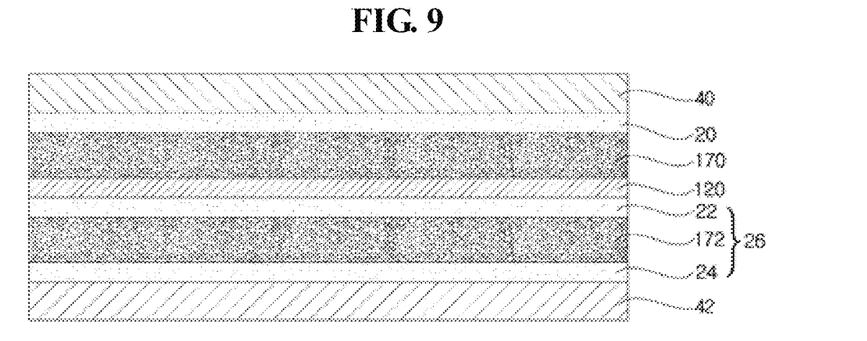
FIG. 9 is a cross-sectional view of a conductive adhesive tape according to a fifth embodiment of the present invention.

FIG. 9 is a cross-sectional view of a conductive adhesive tape according to a fifth embodiment of the present invention.

The conductive adhesive tape according to the fifth embodiment includes: a first substrate 170 that is formed in a nano-web form of a certain thickness by accumulating ultra-fine fiber strands by a spinning method; a non-porous film layer 120 formed on one surface of the first substrate 170; a first conductive adhesive layer 20 that is laminated on the other surface of the first substrate 170; and a double-sided adhesive tape 26 that is laminated on the non-porous film layer 120.

The first substrate 170 and the non-porous film layer 120 formed on the first substrate 170 are of the same structures as those of the substrate 10 and the non-porous film layer 120 formed on the substrate 10 described in the third embodiment, and the configuration of laminating the first conductive adhesive layer 20 on one surface of the first substrate 170 is the same as that of laminating the first conductive adhesive layer 20 on one surface of the substrate 10 described in the third embodiment.

The conductive double-sided tape 26 includes: a second substrate 172 that is formed in a nano-web form of a certain thickness by accumulating ultra-fine fiber strands by a spinning method; a second conductive adhesive layer 22 formed on one surface of the second substrate 172; and a third conductive adhesive layer 24 formed on the other surface of the second substrate 172.

Here, the structure of the conductive double-sided tape 26 is the same as that of the conductive adhesive tape described in the first embodiment.

The conductive adhesive tape according to the fifth embodiment is manufactured by preparing the first substrate 170 and the non-porous film layer 120 by one electrospinning device, preparing the first conductive adhesive layer 20 by another electrospinning device, preparing the double-sided tape 26 by another electrospinning device, primarily laminating the first conductive adhesive layer 20 on one surface of the first substrate 170, and secondarily laminating the double-sided tape 26 on the non-porous film layer 120.

Figure 10:
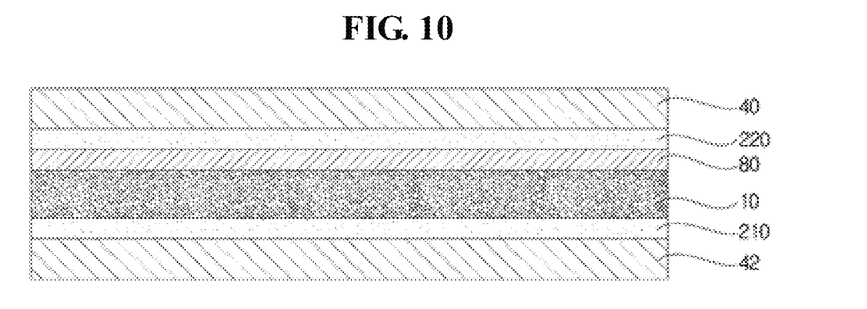
FIG. 10 is a cross-sectional view of a conductive adhesive tape according to a sixth embodiment of the present invention.

FIG. 10 is a cross-sectional view of a conductive adhesive tape according to a sixth embodiment of the present invention.

The conductive adhesive tape according to the sixth embodiment is configured to include: a substrate 10 that is formed in a nano-web form having a plurality of pores 12 by the same electrospinning method as that of the substrate 10 described in the first embodiment; and conductive adhesive layers 210 and/or 220 that are formed on both surfaces or one surface of the substrate 10, by using any one of a casting method, a coating method, and gravure coating method.

That is, the conductive adhesive tape according to the third embodiment is configured by preparing the substrate 10 by the electrospinning method, and then stacking conductive adhesive layers 210 and/or 220 on both surfaces or one surface of the substrate 10, by using conventional various methods.

Then, an electromagnetic wave shielding layer 80 for shielding electromagnetic waves is stacked on one surface of the substrate 10. That is, the electromagnetic wave shielding layer 80 is formed by depositing a conductive metal on one surface of the substrate 10.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The conductive adhesive tape according to the present invention can be made thin, can improve the adhesive strength, can be precisely attached to even a curved surface, and can prevent the adhesive layer from remaining on the surface of a component when the conductive adhesive tape is separated from the component, and may be applied to a variety of industrial fields.

The invention claimed is:

1. A conductive adhesive tape comprising:
   a substrate formed of a polymer material in a nano-web form and having a number of pores, wherein the substrate is formed by spinning the polymer material; and
   an electrical conductive adhesive layer formed directly on the substrate, the electrical conductive adhesive layer being formed of an electrical conductive adhesive material in a non-porous form, the electrical conductive adhesive material being absorbed into and filled in the pores of the substrate, wherein the electrical conductive adhesive layer is formed by spinning the electrical conductive adhesive material.

2. The conductive adhesive tape according to claim 1, wherein the spinning includes any one of electrospinning, air-electrospinning (AES), electrospray, electrobrown spinning, centrifugal electrospinning, and flash-electrospinning.

3. The conductive adhesive tape according to claim 1, wherein the electrical conductive adhesive material comprises any one of an electrically conductive metal, carbon black, carbon nanotube, graphene and conductive polymer (PDOT), and an adhesive.

4. The conductive adhesive tape according to claim 1, wherein the electrical conductive adhesive layer comprises a first electrical conductive adhesive layer formed on one surface of the substrate, and a second electrical conductive adhesive layer formed on the other surface of the substrate, the one surface being opposite to the other surface.

5. The conductive adhesive tape according to claim 4, wherein the first electrical conductive adhesive layer and the second electrical conductive adhesive layer have different adhesive strengths.

6. The conductive adhesive tape according to claim 5, further comprising a first release film formed on a surface of the first electrical conductive adhesive layer, and a second release film formed on a surface of the second electrical conductive adhesive layer, wherein the first release film and the second release film are formed of different materials having different peeling strengths.

7. The conductive adhesive tape according to claim 4, further comprising an electromagnetic wave shielding layer formed between the second electrical conductive adhesive layer and the substrate.

8. The conductive adhesive tape according to claim 7, wherein the electromagnetic wave shielding layer is formed by depositing a conductive metallic material on a surface of the substrate.

9. The conductive adhesive tape according to claim 4, further comprising:
   a non-porous film layer that is formed between the substrate and the first electrical conductive adhesive layer.

10. The conductive adhesive tape according to claim 9, further comprising a second substrate that is formed between the non-porous film layer and the first electrical conductive adhesive layer.

* * * * *